United States Patent
Von Novak et al.

(10) Patent No.: US 9,118,185 B2
(45) Date of Patent: Aug. 25, 2015

(54) SYSTEMS AND METHODS FOR HIGH POWER FACTOR CHARGING

(71) Applicant: QUALCOMM Incorporated, San Diego, CA (US)

(72) Inventors: William H. Von Novak, San Diego, CA (US); Linda S. Irish, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 13/645,337

(22) Filed: Oct. 4, 2012

(65) Prior Publication Data

US 2013/0300375 A1 Nov. 14, 2013

Related U.S. Application Data

(60) Provisional application No. 61/646,770, filed on May 14, 2012.

(51) Int. Cl.
*H02J 7/00* (2006.01)
*H02J 7/04* (2006.01)
*H02J 3/18* (2006.01)

(52) U.S. Cl.
CPC . *H02J 7/00* (2013.01); *H02J 7/045* (2013.01); *H02J 3/1892* (2013.01)

(58) Field of Classification Search
CPC ........... H02J 7/00; H02J 7/045; H02J 7/0072; H02M 1/4208; Y02B 70/126
USPC ....................................................... 320/137
See application file for complete search history.

(56) References Cited

U.S. PATENT DOCUMENTS

| | | |
|---|---|---|
| 5,331,534 A | 7/1994 | Suzuki et al. |
| 5,563,758 A | 10/1996 | Dembrosky et al. |
| 5,608,614 A | 3/1997 | Ohnishi et al. |

(Continued)

FOREIGN PATENT DOCUMENTS

WO   WO9804964 A1   2/1998

OTHER PUBLICATIONS

International Search Report and Written Opinion—PCT/US2013/039473—ISA/EPO—Jul. 30, 2013.

(Continued)

*Primary Examiner* — Jack Chiang
*Assistant Examiner* — Brandon Bowers
(74) *Attorney, Agent, or Firm* — Knobbe, Martens, Olson and Bear LLP

(57) ABSTRACT

In one aspect, an apparatus for charging a device includes a charger and a controller. The charger includes a capacitance and has a charger input and a charger output. The charger input receives an AC input voltage waveform, and the charger output outputs an output voltage waveform and an output current waveform. The controller determines whether an amplitude of the output voltage waveform is within a voltage range. In response to determining that the amplitude of the output voltage waveform is within the voltage range, the controller directs an amplitude of the output current waveform to be substantially proportional to an amplitude of the AC input voltage waveform. In response to determining that the amplitude of the output voltage waveform is not within the voltage range, the controller increases the capacitance of the charger to adjust the amplitude of the output voltage waveform to be within the voltage range.

17 Claims, 7 Drawing Sheets

(56) References Cited

U.S. PATENT DOCUMENTS

| | | |
|---|---|---|
| 5,786,992 A * | 7/1998 | Vinciarelli et al. ............ 363/89 |
| 6,081,104 A | 6/2000 | Kern |
| 6,781,351 B2 * | 8/2004 | Mednik et al. ................ 323/222 |
| 7,561,446 B1 * | 7/2009 | Vinciarelli ...................... 363/17 |
| 7,616,455 B2 | 11/2009 | Cameron et al. |
| 7,821,801 B2 | 10/2010 | Janson et al. |
| 2002/0071300 A1 | 6/2002 | Jang et al. |
| 2005/0088138 A1 | 4/2005 | Sasaki |
| 2007/0008162 A1 | 1/2007 | Gossett et al. |
| 2009/0097286 A1 | 4/2009 | Lin et al. |
| 2010/0181963 A1 * | 7/2010 | Schreiber ...................... 320/108 |
| 2012/0024965 A1 | 2/2012 | Kawae et al. |
| 2014/0098584 A1 * | 4/2014 | Gucyski et al. ............... 363/126 |

OTHER PUBLICATIONS

Linear Technology, "Isolated LED Current Control with Active PFC," LT3799, Retrieved from the Internet: http://cds.linear.com/docs/Ad/3799.pdf, Retrieved on Feb. 24, 2012, 1 page.

* cited by examiner

SYSTEMS AND METHODS FOR HIGH POWER FACTOR CHARGING

CROSS REFERENCE TO RELATED APPLICATIONS

This application claims benefit under 35 U.S.C. §119(e) to U.S. Provisional Patent Application No. 61/646,770 entitled "SYSTEMS AND METHODS FOR HIGH POWER FACTOR CHARGING" filed on May 14, 2012; the disclosure of which is hereby incorporated by reference in its entirety.

FIELD

The present disclosure relates generally to power transfer. More specifically, the present disclosure relates to systems and methods for high power factor charging.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. These devices are often charged by connecting the devices to a DC power source. In many instances, the DC voltage of the DC power source may be maintained by a rectifier connected to an AC power source, such as mains power. However, because the rectifier places a non-linear load on the AC power source, the rectifier outputs a non-linear current and causes a diminished power factor (i.e., the ratio of the real power flowing into the load to the apparent power flowing to the load) for a charging system. Diminished power factors, in turn, result in increased energy losses and wasted energy in charging systems. Accordingly, due higher costs of energy, increasing energy losses in charging systems, and power factor government regulations, improved systems and methods for high power factor charging are desired.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for charging a device, the apparatus including a charger and a controller. The charger includes a capacitance and has a charger input and a charger output. The charger input is configured to receive an AC input voltage waveform, and the charger output is configured to output an output voltage waveform and an output current waveform. The controller is operationally coupled to the charger and configured to determine whether an amplitude of the output voltage waveform is within a voltage range. In response to determining that the amplitude of the output voltage waveform is within the voltage range, the controller is configured to direct an amplitude of the output current waveform to be substantially proportional to an amplitude of the AC input voltage waveform. In response to determining that the amplitude of the output voltage waveform is not within the voltage range, the controller is configured to increase the capacitance of the charger to adjust the amplitude of the output voltage waveform to be within the voltage range.

Another aspect of the disclosure provides a method for charging a device with a charger, the method comprising: determining whether an amplitude of an output voltage waveform at an output of a charger is within a voltage range; in response to determining that the amplitude of the output voltage waveform is within the voltage range, directing an amplitude of an output current waveform at the output to be substantially proportional to an amplitude of an AC input voltage waveform at an input of the charger; and in response to determining that the amplitude of the output voltage waveform is not within the voltage range, increasing a capacitance of the charger to adjust the amplitude of the output voltage waveform to be within the voltage range.

One aspect of the disclosure provides an apparatus for charging a device, the apparatus comprising: means for determining whether an amplitude of an output voltage waveform at an output of a charger is within a voltage range; in response to determining that the amplitude of the output voltage waveform is within the voltage range, means for directing an amplitude of an output current waveform at the output to be substantially proportional to an amplitude of an AC input voltage waveform at an input of the charger; and in response to determining that the amplitude of the output voltage waveform is not within the voltage range, means for increasing a capacitance of the charger to adjust the amplitude of the output voltage waveform to be within the voltage range.

Another aspect of the disclosure provides a non-transitory computer storage that stores executable program instructions that direct a controller to perform a process that comprises: determining whether an amplitude of an output voltage waveform at an output of a charger is within a voltage range; in response to determining that the amplitude of the output voltage waveform is within the voltage range, directing an amplitude of an output current waveform at the output to be substantially proportional to an amplitude of an AC input voltage waveform at an input of the charger; and in response to determining that the amplitude of the output voltage is not within the voltage range, increasing a capacitance of the charger to adjust the amplitude of the output voltage waveform to be within the voltage range.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Figure 1:
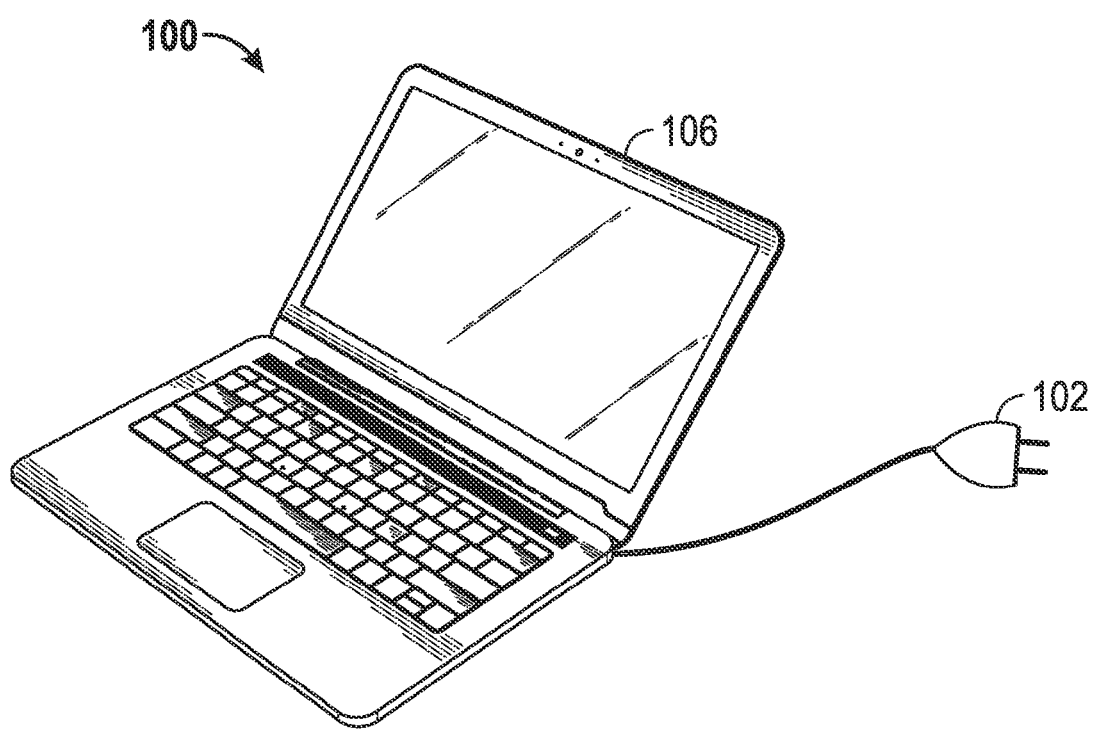
FIG. 1 illustrates an example charging system in which aspects of the present disclosure may be employed.

FIG. 1 is a functional block diagram of an example charging system 100. The charging system 100 includes a charger 102 and a load 106. The charger 102 may include an AC-to-DC converter, such as a rectifier, and a power converter to decrease the output voltage from the AC-to-DC converter to an appropriate level for powering the load 106 or for charging a battery in the load 106 ("powering" or "charging" may be referenced throughout this disclosure to illustrate aspects of the disclosure; in some aspects, charging may include powering). The load 106 may be any device capable of receiving a transfer of power. The load 106 may be a device such as a mobile phone, portable music player, laptop computer, tablet computer, computer peripheral device, communication device (e.g., Bluetooth device), digital camera, and hearing aid, as examples.

Input power may be provided from an input power source (not shown) to the charger 102. The input power may be mains AC power (e.g., 120 Vrms or 240 Vrms at a frequency of 50 Hz or 60 Hz) electrically coupled to the charger 102 by connecting the charger 102 to a wall power outlet. The charger 102 may couple DC input power to the load 106 via a cord to the load 106 so that the load 106 may consume the power or store the power, such as by charging a battery. In some aspects, the load 106 may include the charger 102.

The load 106 may require a DC voltage power source that provides a voltage within a particular voltage range to properly function. For example, the load 106 may receive a voltage within a range of 3.3 V and 4.2 V. The voltage may change within the range, such as by a swing or ripple in the voltage (e.g., at 100 Hz or 120 Hz, twice the frequency of the AC input voltage), without damaging the load 106 or charger 102. However, DC voltages outside the range may risk damaging the load 106 or charger 102 since the load 106 or charger 102 may not be configured to or capable of operating at certain voltages or currents.

Figure 2:
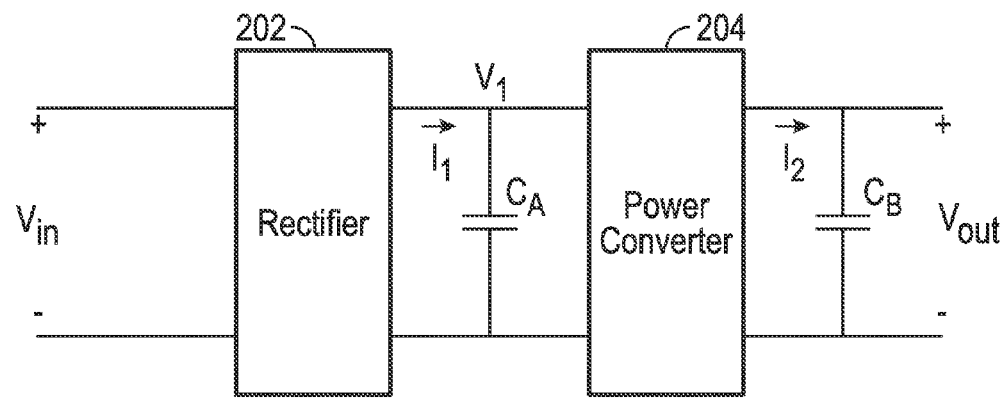
FIG. 2 is a functional block diagram of example components in a charging system.

FIG. 2 is a functional block diagram of example components in a charging system 200. The charging system 200 includes a rectifier 202 and a power converter 204. The rectifier 202 and the power converter 204 are connected in parallel with each other. A capacitor $C_A$ is connected in parallel between the rectifier 202 and power converter 204, and a capacitor $C_B$ is connected to the output of the power converter 204. The charging system 200 may be included in the charger 102 of FIG. 1, for instance.

An input voltage $V_{in}$ and input current may be applied to the input of the rectifier 202. The input voltage may be an AC voltage from mains AC power, for example. The rectifier 204 may receive the input voltage $V_{in}$ and convert the AC input voltage to a pulsating DC rectifier output voltage $V_1$ and a pulsating current $I_1$ that flows in one direction. The DC rectifier output voltage $V_1$ may charge and discharge capacitor $C_A$ so that the DC rectifier output voltage $V_1$ changes relatively slowly from an average voltage.

The DC rectifier output voltage $V_1$ and pulsating current $I_1$ may be received by the power converter 204. The power converter 204 may perform a DC-to-DC conversion to provide a lower DC voltage $V_{out}$ at the charging system 200 output than the DC rectifier output voltage $V_1$. The power converter 204 may, for example, be a forward, full bridge, resonant, flyback, or push-pull converter. In some aspects, the power converter 204 may decrease a pulsating DC rectifier output voltage $V_1$ of approximately an average of 120-160 V to an average voltage level of 4 V or 19 V at the charging system output. The output voltage $V_{out}$ may power or charge a device connected to the output of the charging system 200.

In some aspects, capacitor $C_A$ may be a capacitor having a variable capacitance, and the capacitance of capacitor $C_A$ may increase or decrease. As the capacitance of capacitor $C_A$ increases, advantageously a decreased ripple may appear in the DC rectifier output voltage $V_1$ and the output voltage $V_{out}$ of power converter 204. Devices with particular charging voltage limits may accordingly safely charge within the limits since the decreased ripple may mean that the output voltage $V_{out}$ remains within the limits. However, as the capacitance of capacitor $C_A$ increases, the power factor (i.e., the real power divided by the apparent power, or the ratio of the real power flowing into the load to the apparent power flowing to the load) of the charging system 200 diminishes. The combination of the rectifier and the increased capacitance further increases the non-linearity of the charging system load as seen at the input of the rectifier 202. The diminished power factor results in less efficient use of power by the charging system.

Table 1 below lists relationships between the time constant of a resistor-capacitor load (i.e., load resistance multiplied by load capacitance) and the power factor for a charging system that includes a rectifier connected to the resistor-capacitor load. The values in Table 1 were determined based on example simulations. As can be seen from Table 1, a smaller load capacitance relative to a load resistance may increase the power factor in a charging system. Notably, a shorter time constant may also result in an increased ripple in the output voltage of the resistor-capacitor load.

TABLE 1

| Time Constant | Power Factor |
| --- | --- |
| 1 nS | 1.00 |
| 1 mS | 0.948 |
| 10 mS | 0.6455 |
| 100 mS | 0.4262 |

Alternatively, as the capacitance of $C_A$ decreases, advantageously the power factor of the charging system 200 may increase. However, the decreased capacitance of $C_A$ may result in a greater swing or ripple in the DC rectifier output voltage $V_1$ and the output voltage $V_{out}$. The increased ripple in the output voltage $V_{out}$ of the power converter 204 may cause voltage swings that move the voltage outside of the permissible operating or charging voltages of devices connected to the output of the charging system 200.

The relationship between the swing or ripple in the output voltage $V_{out}$ may be calculated using Equation 1 stated below, assuming the value of capacitor $C_B$ has been minimized in the charging system 200.

$$\Delta V_{out} \approx \frac{I_2}{2 \cdot f_{in} \cdot C_A} \quad \text{(Equation 1)}$$

where $\Delta V_{out}$ is the change in the output voltage $V_{out}$, $I_2$ is the current output from the power converter 204, $f_{in}$ is the frequency of the input voltage $V_{in}$, and $C_A$ is the capacitance of capacitor $C_A$.

In some aspects, a battery may be electrically connected to the output voltage $V_{out}$ to receive the voltage and energy. In such cases, the battery may further decrease any voltage swing or ripple of the output voltage $V_{out}$ since battery may tend to maintain a particular voltage level.

Figure 3:
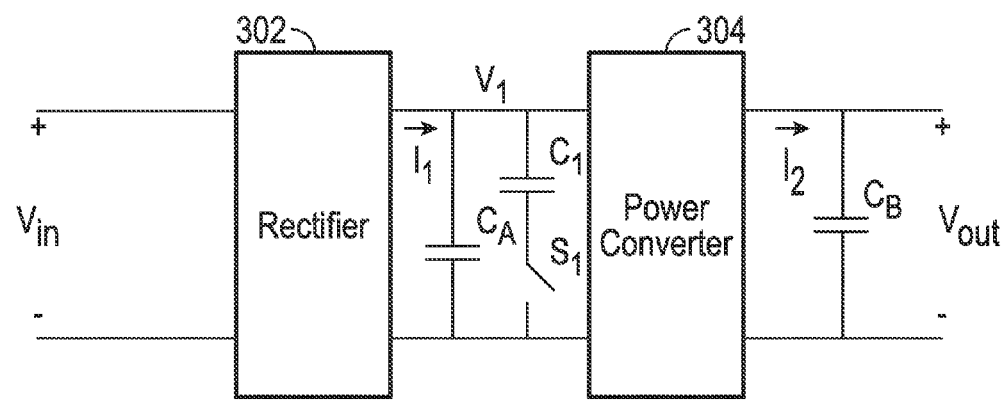
FIG. 3 is another functional block diagram of example components in a charging system.

FIG. 3 is a functional block diagram of example components in a charging system 300. The charging system 300, for instance, may be included in the charger 102 of FIG. 1. The charging system 300 includes a rectifier 302 and a power converter 304. The rectifier 302 and the power converter 304 are connected in parallel with each other. A capacitor $C_A$ is connected in parallel between the rectifier 302 and power converter 304, and a capacitor $C_B$ is connected in parallel to the output of the power converter 304. The charging system 300 may be similar to the charging system 200 of FIG. 2 except for the additional capacitor $C_1$ in series with switch $S_1$. The capacitor $C_1$ and switch $S_1$ are together in parallel with capacitor $C_A$. In some aspects, capacitor $C_1$ may have a relatively greater capacitance than capacitor $C_A$.

Switch $S_1$ may control the inclusion or exclusion of capacitor $C_1$ in the charging system circuit. When the switch $S_1$ is open, the capacitor $C_1$ is effectively removed from the circuit, and capacitor $C_A$ may influence voltage levels of the charging system 300. On the other hand, when the switch $S_1$ is closed, the capacitance of capacitor $C_1$ is added to the capacitance of capacitor $C_A$ in the circuit and may increase the capacitance at the output of the rectifier 302 and the input of the power converter 304. In some aspects, bleed resistors may also be included in parallel with switch $S_1$. The bleed resistors may be used to precharge the capacitor $C_1$ and reduce transient effects when closing switch $S_1$. In some aspects, more than one switch and capacitor combination may be used to increase the possible range of capacitance change. Further, in some aspects, other approaches are utilized in addition to or instead of switch $S_1$ and capacitor $C_1$ to increase or decrease the capacitance between the rectifier 302 and the power converter 304.

Figure 4:
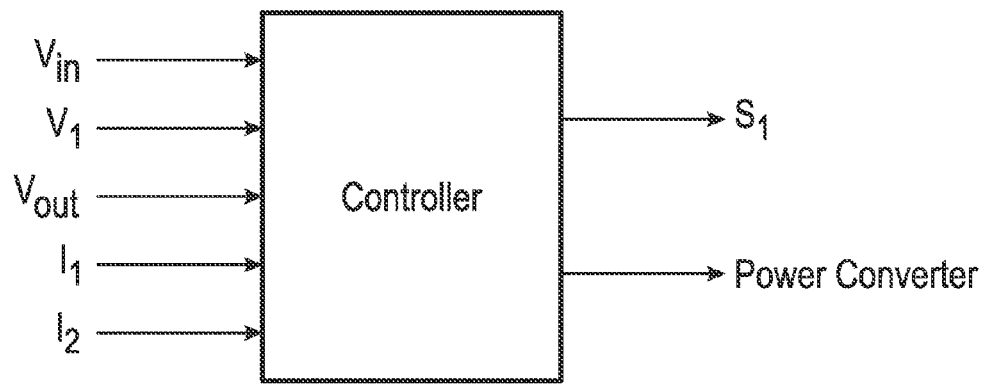
FIG. 4 is a functional block diagram of an example controller for use in a charging system, such as the charging system of FIG. 3.

FIG. 4 is a functional block diagram of an example controller 410. The controller 410 may be used as part of the charging system 300 of FIG. 3, for example. The controller 410 may receive inputs, including the measured voltages $V_{in}$, $V_1$, and $V_{out}$ and the measured currents $I_1$ and $I_2$ from the charging system 300. The controller 410 may be configured to output control signals to control switch $S_1$, as well as the power converter 304. The controller 410 may control the power converter 304 or switch $S_1$ so that the voltage $V_{out}$ remains within a particular range $V_{MIN}$ to $V_{MAX}$. Further, the controller 410 may control the power converter 304 or switch $S_1$ so that the amplitudes of the current $I_1$ or $I_2$ waveforms are proportional to the amplitude of the voltage input $V_{in}$ waveform, a current input waveform, or a power input waveform (i.e., the product of the voltage input $V_{in}$ waveform and the current input waveform). For example, the controller 410 may control the power converter 304 so that the current $I_1$ or $I_2$ waveforms are substantially a 120 Hz half sinusoid when the voltage input $V_{in}$ waveform is a 60 Hz mains power supply. In some aspects, the controller 410 may direct the amplitude of the current waveforms to be substantially proportional to the amplitude of the voltage input $V_{in}$ waveform when the output voltage $V_{out}$ is within the particular range $V_{MIN}$ to $V_{MAX}$ (e.g., 4.45 V to 5.25 V), but not when the output voltage $V_{out}$ falls below $V_{MIN}$ or exceeds $V_{MAX}$. Additionally, in some aspects, the controller may cause the switch $S_1$ to open and close and may cause the power converter 304 to switch between different operating modes or voltage levels to maintain a desired output voltage level or range.

Figure 5:
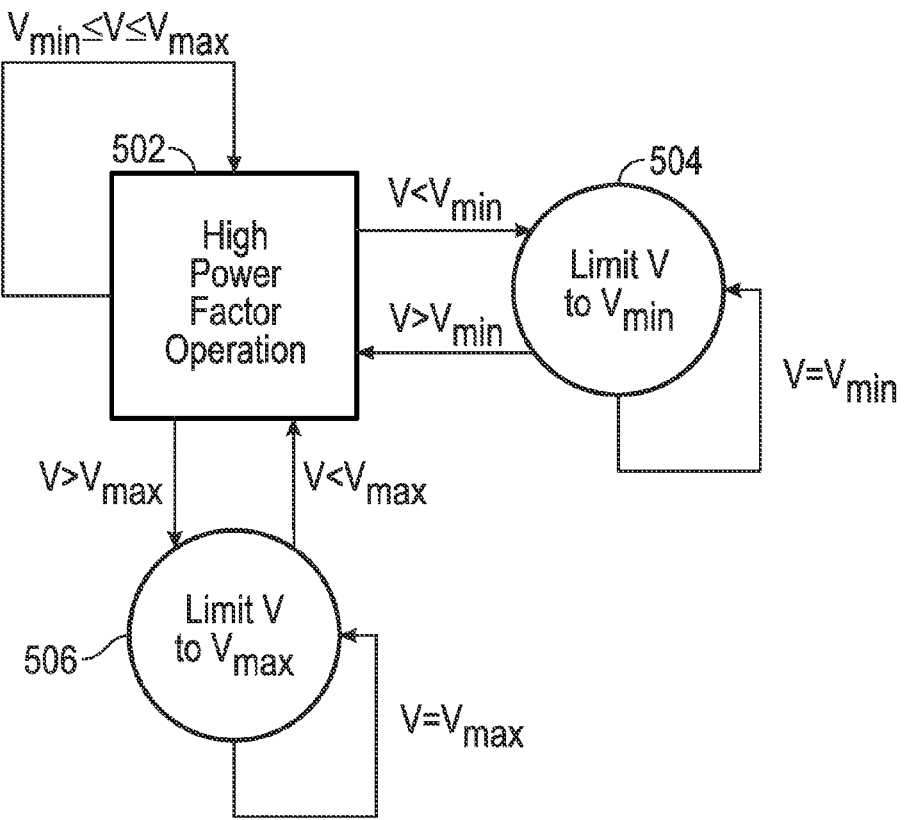
FIG. 5 is state diagram of an example control process performed in a charging system, such as the control process performed by the controller of FIG. 4.

FIG. 5 is state diagram 500 of an example control process performed by a controller in a charging system. The controller performing the control process may correspond to the controller 410 of FIG. 4, for example. The voltage V may correspond to the output voltage $V_{out}$ of the charging system 200 of FIG. 2 or the charging system 300 of FIG. 3, for example. The voltages $V_{MIN}$ and $V_{MAX}$ may be variable voltage limits. The voltage limits may depend on or be set based on the particular charging system, device to be charged, or type of device to be connected to the output voltage $V_{out}$, for instance. Advantageously, devices that may not operate using non-pulsating power supplies may receive power from a charging system using this control process because the control process may ensure that the voltage V remains within voltage charging limits of devices to be charged.

At state 502, when the voltage V is equal to or greater than $V_{MIN}$ and the voltage equal to or less than voltage $V_{MAX}$, a charging system, such as charging system 300 of FIG. 3, may operate in high power factor operation mode. In one aspect, in high power factor operation mode, the switch $S_1$ of FIG. 3 may be opened, allowing the voltages $V_1$ and $V_{out}$ of charging system 300 to vary a greater amount than if the switch $S_1$ is closed. Advantageously, as the voltages $V_1$ and $V_{out}$ of charging system 300 are permitted to vary a greater amount, the power factor of the charging system 300 may increase.

Once the voltage V falls below $V_{MIN}$, the state of the control process moves to state 504, and the charging system, such as charging system 300 of FIG. 3, may operate in voltage limiting mode. In voltage limiting mode, the charging system may no longer attempt to optimize the power factor for the charging system. Instead, the charging system may function in a lower power factor mode and prevent the voltage V from decreasing to a voltage below $V_{MIN}$. In one aspect, in voltage limiting mode, the switch $S_1$ of FIG. 3 may be closed, causing the voltages $V_1$ and $V_{out}$ of charging system 300 to vary a lesser amount than if the switch $S_1$ is open. Advantageously, voltage limiting mode may prevent the voltage from falling below the permissible operating or charging ranges for a device being charged by the voltage V.

Once the voltage V exceeds $V_{MAX}$, the state of the control process moves to state 506, and the charging system, such as charging system 300 of FIG. 3, may operate in voltage limiting mode. In voltage limiting mode, the charging system may no longer strive to optimize the power factor for the charging system. Instead, the charging system may function in a lower power factor mode and prevent the voltage V from increasing above a certain voltage threshold. In one aspect, in voltage limiting mode, the switch $S_1$ of FIG. 3 may be closed, causing the voltages $V_1$ and $V_{out}$ of charging system 300 to vary a lesser amount than if the switch $S_1$ is open. Advantageously, voltage limiting mode may prevent the voltage V from exceeding the permissible operating or charging ranges for a device being charged by the voltage V.

Figure 6:
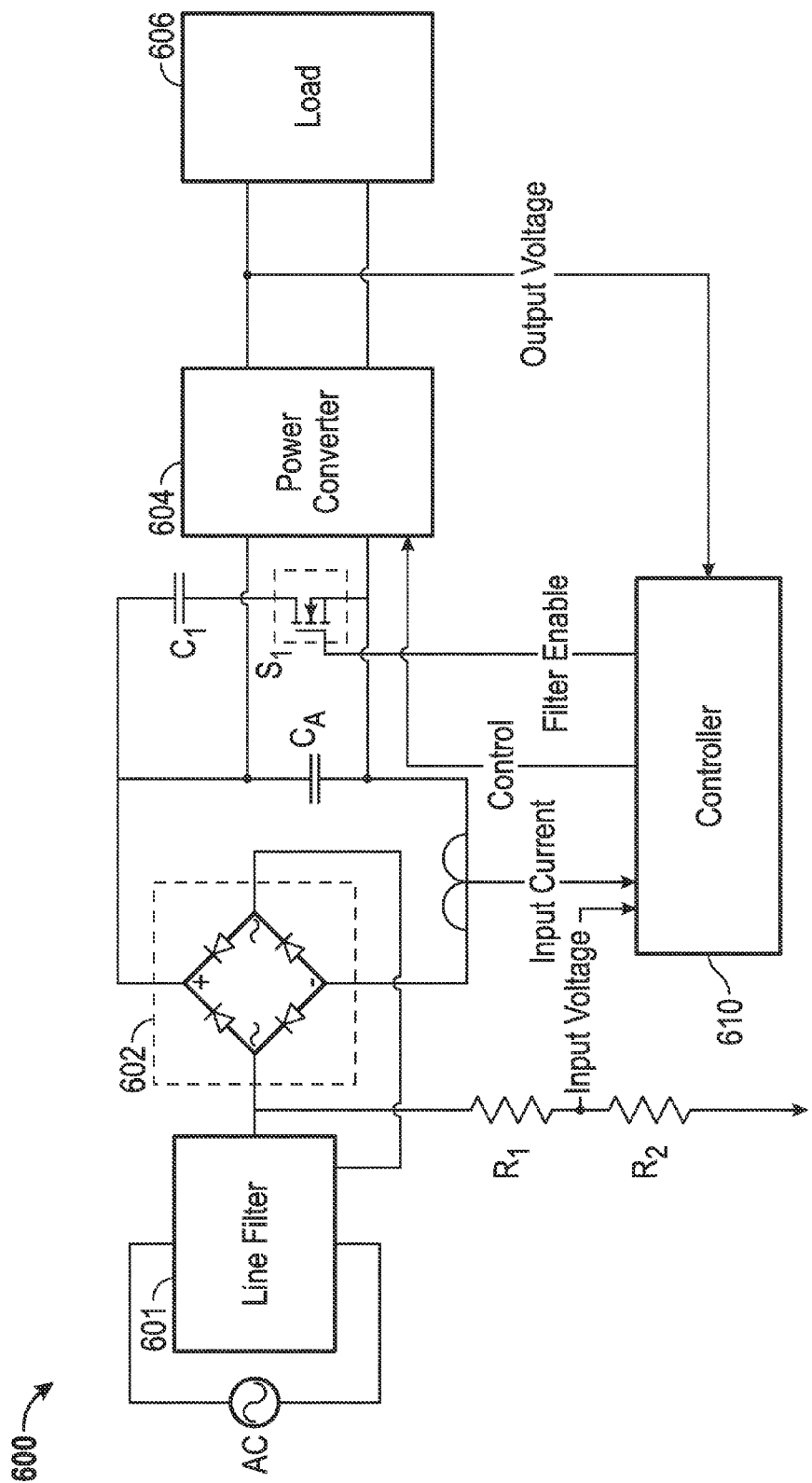
FIG. 6 is a functional block diagram of example components in another charging system.

FIG. 6 is a functional block diagram of example components in another charging system 600. The charging system 600 includes an AC supply, a line filter 601, a full-wave bridge rectifier 602, a power converter 604, a load 606, and a controller 610. The line filter 601 may attenuate the switching frequency of the full-wave bridge rectifier 602 and power converter 604 along with high-order harmonics. A capacitor $C_A$ is connected in parallel between the full-wave bridge rectifier 602 and power converter 604, and a capacitor $C_1$ and switch $S_1$ are together in parallel with capacitor $C_A$. In some aspects, capacitor $C_1$ may have a relatively greater capacitance than capacitor $C_A$. A voltage divider, including resistors $R_1$ and $R_2$, may provide an input voltage to the controller 610 proportional to the input voltage to the full-wave bridge rectifier 602 from the line filter 601. Further, the controller 610 may receive an input current measurement corresponding to the current output of the full-wave bridge rectifier 602 and an output voltage measurement corresponding to the voltage output of the power converter 604. Based on the input voltage, input current, and output voltage, the controller 610 may control operation of the power converter 604 and enable and disable the switch $S_1$.

In some aspects, the charging systems discussed in this disclosure may include one or more of a bridge rectifier, a blanking detector, a power factor error amplifier, a battery voltage error amplifier, a full bridge converter, a controlled phase shift network, and an anti-shoot through and gate drive logic.

The bridge rectifier may rectify incoming AC power to DC. The current bridge in the rectifier may be sensed and use power factor control loops. The blanking detector may keep the power converter from running when the instantaneous rectifier voltage is too low for the power converter to operate. The power factor error amplifier may try to keep the line current proportional to the rectifier voltage outside of the blanking interval along with being proportional to the battery voltage error amplifier output. The power factor error amplifier may not run during a blanking interval. The battery voltage error amplifier may be slow to minimize distortion in the AC line waveform, and the battery voltage error amplifier bandwidth may be less than 120 Hz.

Figure 7:
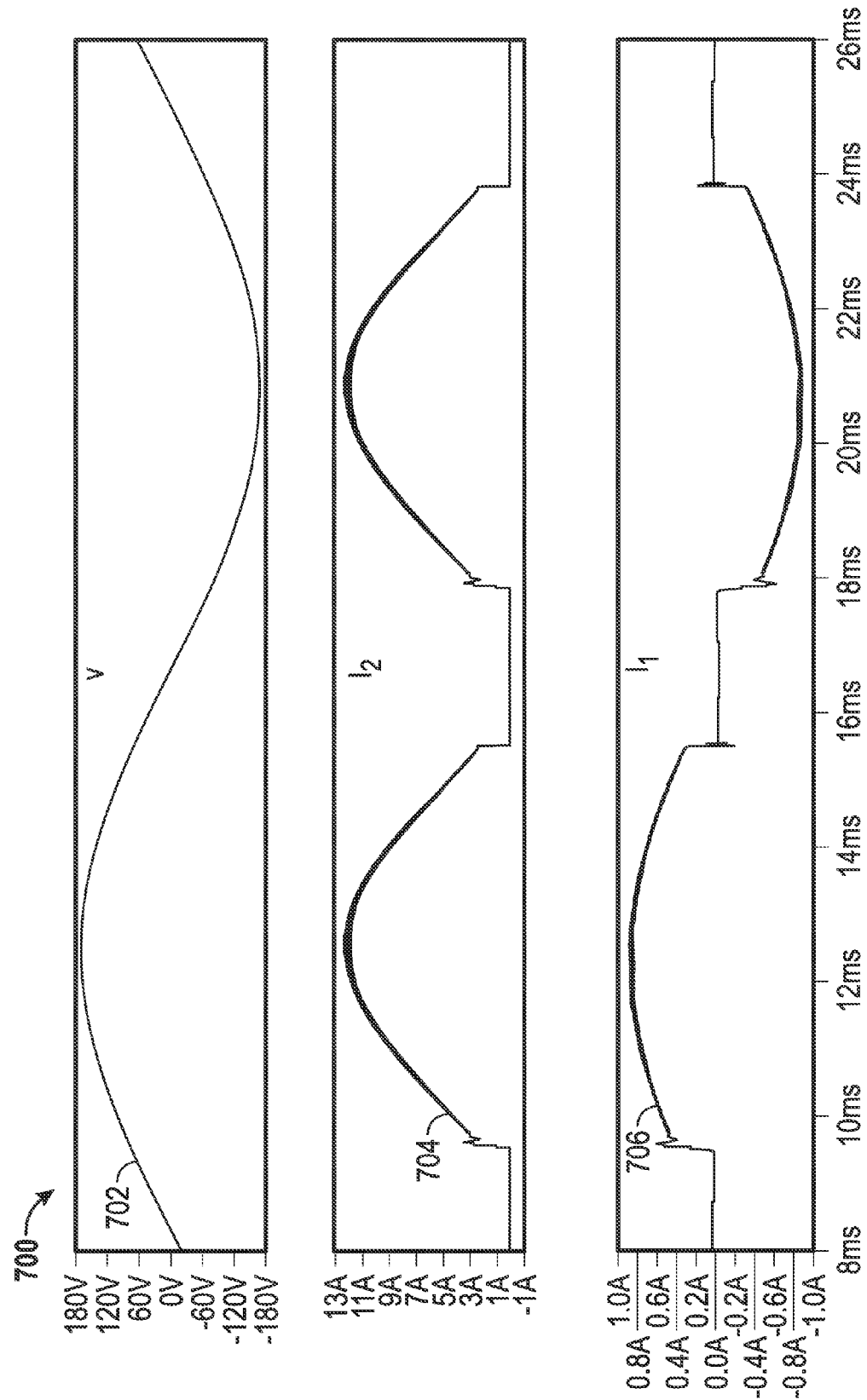
FIG. 7 is graphs of voltage and current waveforms in an example charging system.

FIG. 7 is graphs 700 of voltage and current waveforms in an example charging system, such as the charging system 300 of FIG. 3. The V plot 702 is the amplitude of the input voltage waveform to the charging system versus time, such as voltage $V_{in}$ of FIG. 3 versus time, and the $I_1$ plot 706 is the amplitude of the input current waveform to the charging system versus time, such as current $I_1$ of FIG. 3 versus time. The $I_2$ plot 704 is the amplitude of the output current waveform to a charging battery connected to the charging system versus time, such as current $I_2$ of FIG. 3 versus. The graphs 700 illustrate, among other aspects, that the $I_2$ plot 704 appears to move proportionally to the voltage V plot 702, suggesting a high power factor in the charging system.

Figure 8:
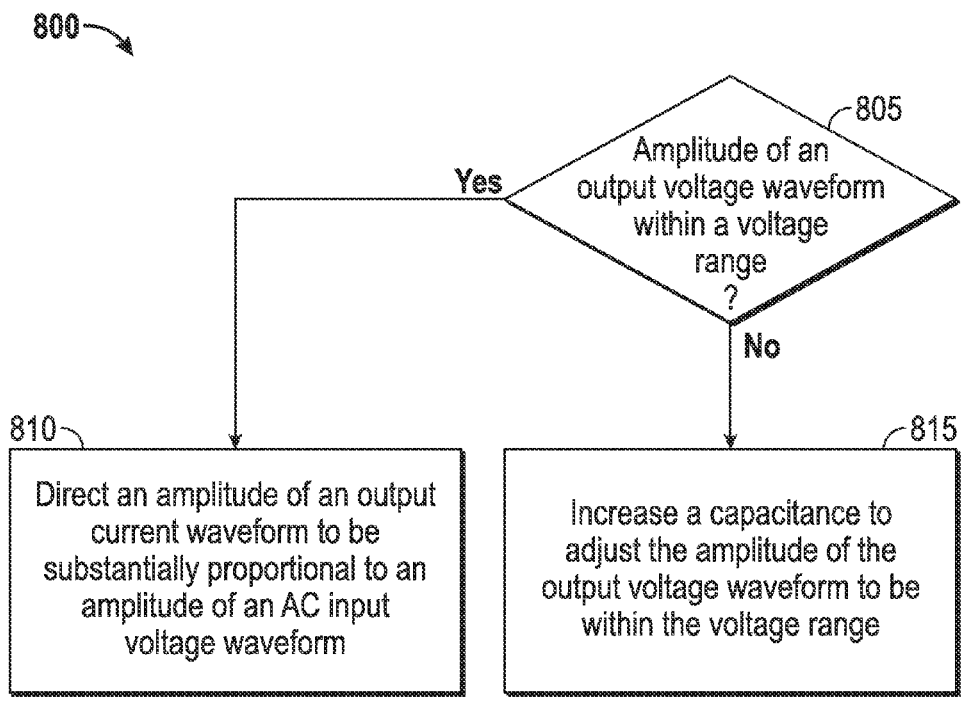
FIG. 8 is a flowchart of an example method for charging a device.

FIG. 8 is a flowchart of an example method 800 for charging a device with a charger. The method 800 may be performed using a controller, such as the controller 410 of FIG. 4 or the controller 610 of FIG. 6, for example. At block 805, the controller may determine whether an amplitude of an output voltage at an output of a charger is within a voltage range. At block 810, in response to determining that the amplitude of the output voltage is within the voltage range, the controller may direct an amplitude of an output current waveform at the output of the charger to be substantially proportional to an amplitude of an AC input voltage waveform at an input of the charger. At block 815, in response to determining that the amplitude of the output voltage is not within the voltage range, the controller may increase a capacitance of the charger to adjust the amplitude of the output voltage to be within the voltage range.

Figure 9:
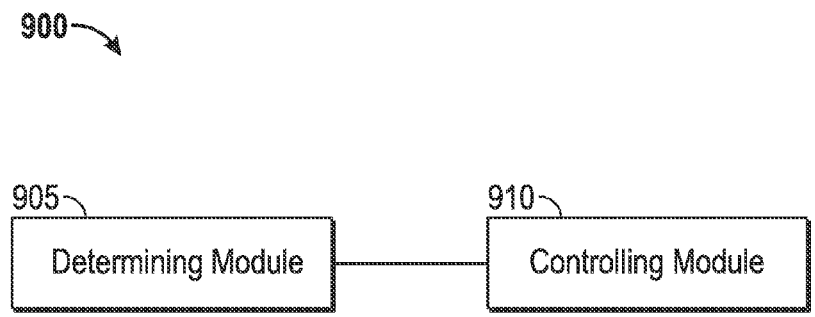
FIG. 9 is a functional block diagram of an example controller for charging a device.

FIG. 9 is a functional block diagram of an example controller 900 for charging a device. The controller 900 may include a determining module 905 configured to determine whether an amplitude of an output voltage at an output of a charger is within a voltage range. The determining module 905 may perform one or more of the functions discussed with respect to block 805 of FIG. 8. The controller 900 may further include a controlling module 910 configured to direct an amplitude of an output current waveform at the output of the charger to be substantially proportional to an amplitude of an AC input voltage waveform at an input of the charger and to increase a capacitance of the charger to adjust the amplitude of the output voltage to be within the voltage range. The controlling module 910 may perform one or more of the functions discussed with respect to blocks 810 and 815 of FIG. 8.

Moreover, in one aspect, means for determining whether an amplitude of an output voltage is within a voltage range may comprise the determining module 905. In another aspect, means for directing an amplitude of an output current waveform at the output of the charger to be substantially proportional to an amplitude of an AC input voltage waveform at an input of the charger and means for increasing the capacitance of the charger to adjust the amplitude of the output voltage to be within the voltage range may comprise the controlling module 910.

Figure 10:
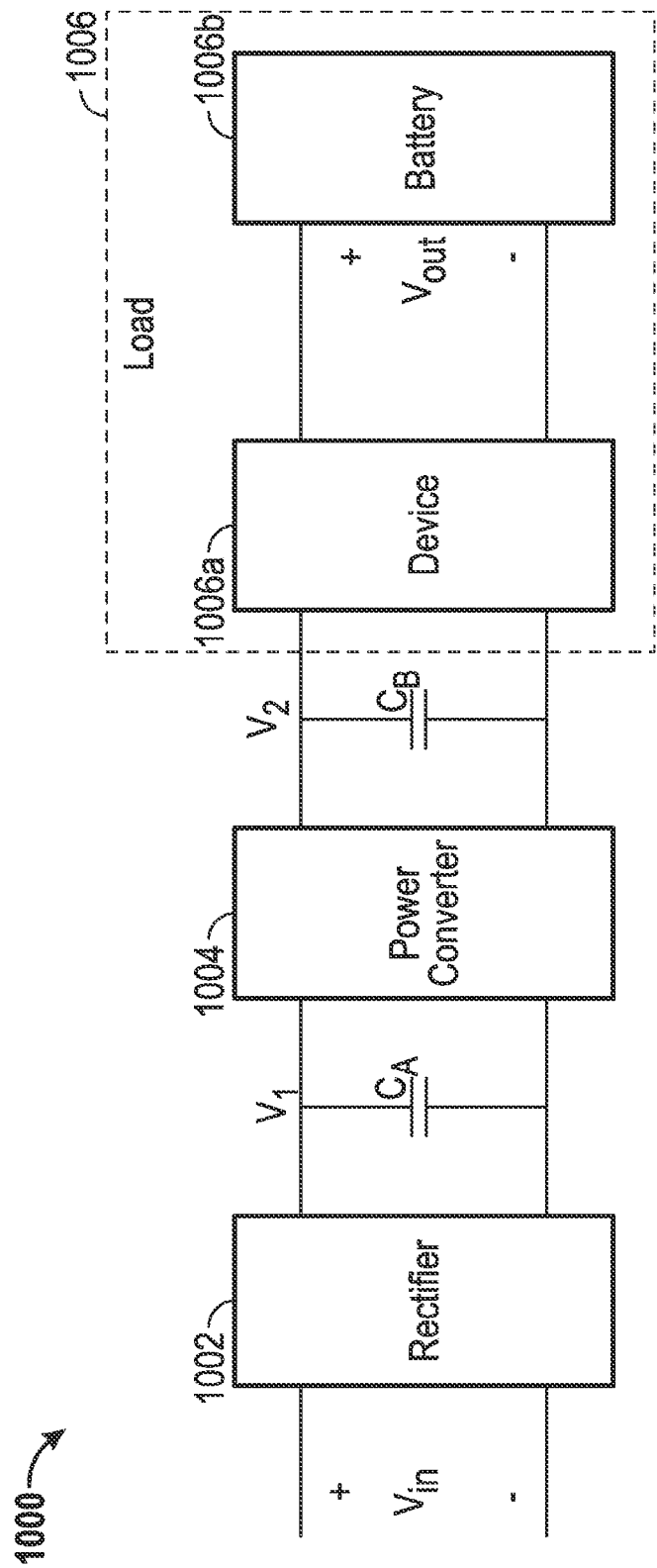
FIG. 10 is a functional block diagram of example components in a charging system.

FIG. 10 is a functional block diagram of example components in a charging system 1000. The charging system 1000 may be similar to the charging system 200 of FIG. 2, but the load 1006, including device 1006a and battery 1006b, may be connected to the output of the power converter 1004, and capacitor $C_A$ may not be a capacitor having a variable capacitance. As in FIG. 2, the input of the power converter 1004 is connected to the output of the rectifier 1002. Capacitor $C_A$ may be relatively small so that the voltage $V_2$ and output voltage $V_{out}$ may be permitted to significantly swing or ripple (e.g., ±20% or ±40% of an average voltage) so that the charging system 1000 may consistently operate in a high power factor mode (e.g., the high power factor mode as discussed in this disclosure). Accordingly, the device 1006a and battery 1006b may be configured to receive the voltages $V_2$ and $V_{out}$, respectively, with a significant swing or ripple (e.g., ±20% to ±40% of the average voltage) to permit frequent or consistent operation in the high power factor mode.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for charging a device with a charger, the method comprising:

determining, by a controller of the charger, whether an amplitude of an output voltage waveform at an output of the charger is within a voltage range, in response to the controller determining that the amplitude of the output voltage waveform is within the voltage range, directing, by the controller, an amplitude of an output current waveform at the output to be substantially proportional to an amplitude of an AC input voltage waveform at an input of the charger, and in response to the controller determining that the amplitude of the output voltage waveform is not within the voltage range, increasing, by the controller, a capacitance of the charger to adjust the amplitude of the output voltage waveform to be within the voltage range.

2. The method of claim 1, wherein the controller increasing the capacitance of the charger comprises the controller switching in a capacitor of the charger, the capacitor electrically connected in parallel to a rectifier output of the charger.

3. The method of claim 1, wherein the controller is configured to electrically connect the output to a battery.

4. The method of claim 1, wherein the controller is configured to set a minimum voltage of the voltage range to a value that is greater than 0 V.

5. The method of claim 1, further comprising the controller setting a minimum voltage or a maximum voltage of the voltage range.

6. The method of claim 1, further comprising the controller setting a minimum voltage or a maximum voltage of the voltage range based on a device electrically coupled to the output.

7. The method of claim 1, wherein the controller is configured to control the power converter such that the output current waveform is substantially a half sinusoid.

8. An apparatus for charging a device, the apparatus comprising:

a charger comprising a capacitance and having a charger input and a charger output, the charger input configured to receive an AC input voltage waveform and the charger output configured to output an output voltage waveform and an output current waveform; and a controller operationally coupled to the charger and configured to:

determine whether an amplitude of the output voltage waveform is within a voltage range;

in response to determining that the amplitude of the output voltage waveform is within the voltage range, direct an amplitude of the output current waveform to be substantially proportional to an amplitude of the AC input voltage waveform; and in response to determining that the amplitude of the output voltage waveform is not within the voltage range, increase the capacitance of the charger to adjust the amplitude of the output voltage waveform to be within the voltage range.

9. The apparatus of claim 8, wherein the controller is configured to increase the capacitance in the charger by switching in a capacitor of the charger, the capacitor electrically connected in parallel to a rectifier output of the charger.

10. The apparatus of claim 8, wherein the charger output is electrically coupled to a battery.

11. The apparatus of claim 8, wherein a minimum voltage of the voltage range is greater than 0 V.

12. The apparatus of claim 8, wherein the controller is further configured to set a minimum voltage or a maximum voltage of the voltage range.

13. The apparatus of claim 8, wherein the controller is further configured to set a minimum voltage or a maximum voltage of the voltage range based on a device electrically coupled to the charger output.

14. The apparatus of claim 8, wherein the output current waveform is substantially a half sinusoid.

15. The apparatus of claim 8, further comprising a device to be charged electrically coupled to the charger output.

16. An apparatus for charging a device, the apparatus comprising:
   means for determining whether an amplitude of an output voltage waveform at an output of a charger is within a voltage range;
   in response to determining that the amplitude of the output voltage waveform is within the voltage range, means for directing an amplitude of an output current waveform at the output to be substantially proportional to an amplitude of an AC input voltage waveform at an input of the charger; and
   in response to determining that the amplitude of the output voltage waveform is not within the voltage range, means for increasing a capacitance of the charger to adjust the amplitude of the output voltage waveform to be within the voltage range.

17. A non-transitory computer storage that stores executable program instructions that direct a controller to perform a process that comprises:
   determining whether an amplitude of an output voltage waveform at an output of a charger is within a voltage range;
   in response to determining that the amplitude of the output voltage waveform is within the voltage range, directing an amplitude of an output current waveform at the output to be substantially proportional to an amplitude of an AC input voltage waveform at an input of the charger; and
   in response to determining that the amplitude of the output voltage is not within the voltage range, increasing a capacitance of the charger to adjust the amplitude of the output voltage waveform to be within the voltage range.

* * * * *